(12) United States Patent
Nandy et al.

(10) Patent No.: US 10,958,554 B2
(45) Date of Patent: Mar. 23, 2021

(54) MONITORING FLOW ACTIVITY ON A NETWORK DEVICE

(71) Applicant: Hewlett Packard Enterprise Development LP, Houston, TX (US)

(72) Inventors: Tathagata Nandy, Bangalore (IN); Rajib Majila, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 153 days.

(21) Appl. No.: 16/108,836

(22) Filed: Aug. 22, 2018

(65) Prior Publication Data

US 2020/0067808 A1 Feb. 27, 2020

(51) Int. Cl.
*H04L 12/26* (2006.01)
*H04L 12/751* (2013.01)
*H04L 29/12* (2006.01)

(52) U.S. Cl.
CPC ........ *H04L 43/0894* (2013.01); *H04L 43/065* (2013.01); *H04L 43/0811* (2013.01); *H04L 43/106* (2013.01); *H04L 45/02* (2013.01); *H04L 61/103* (2013.01); *H04L 61/6022* (2013.01)

(58) Field of Classification Search
CPC .............. H04L 43/0894; H04L 53/065; H04L 43/0811; H04L 43/106; H04L 45/02
See application file for complete search history.

(56) References Cited

U.S. PATENT DOCUMENTS

| 7,483,999 | B2 | 1/2009 | Weyman |
| 8,249,065 | B2 | 8/2012 | Samprathi |
| 8,416,701 | B1 * | 4/2013 | Smead ................ H04L 67/1097 370/250 |
| 9,036,660 | B2 | 5/2015 | Zhang et al. |
| 9,143,419 | B2 | 9/2015 | Sampath et al. |
| 9,197,552 | B1 * | 11/2015 | Edsall ...................... H04L 45/54 |
| 2003/0179742 | A1 * | 9/2003 | Ogier ..................... H04L 1/1887 370/351 |
| 2007/0160064 | A1 * | 7/2007 | Kwon ................... H04W 80/04 370/395.52 |
| 2014/0369228 | A1 * | 12/2014 | Sampath ............. H04L 43/0894 370/253 |
| 2016/0380882 | A1 * | 12/2016 | Thomas .............. H04L 61/6059 370/401 |
| 2018/0013630 | A1 * | 1/2018 | Tatlicioglu .............. H04L 41/12 |

OTHER PUBLICATIONS

Ghent University—IBBT, Department of Information Technology (INTEC), Belgium, Enabling Fast Failure Recovery in OpenFlow Networks, pp. 1-8, retrieved on Jul. 28, 2018 at URL: <biblio.ugent.be/publication/2911632/file/2911638>.

* cited by examiner

*Primary Examiner* — Christopher B Robinson
(74) *Attorney, Agent, or Firm* — Hewlett Packard Enterprise Patent Department (57) ABSTRACT

Examples disclosed herein relate to monitoring flow activity on a network device. In an example, a neighbor table is maintained on a network device. The neighbor table may include a record of a neighbor network device and a hit bit corresponding to the neighbor network device. The hit bit may be used to represent a flow activity of the neighbor network device. A determination may be made whether a status of the hit bit corresponding to the neighbor network device is inactive. If the status of the hit bit is inactive, a flow entry corresponding to the neighbor network device may be deleted from an ASIC table on the network device.

20 Claims, 5 Drawing Sheets

FIG. 1

_uuid: 25742604-c196-4eae-9182-d220afcf641e
address_family: "ipv4"
from: dynamic
iin_use_by_routes: []
ip_address: "100.0.0.10"
last_updated: 1533112390
mac: "00:13:01:00:00:09"
phy_port: fb5ba818-7065-473e-a74e-815014b62aa3
port: fb5ba818-7065-473e-a74e-815014b62aa3
state: reachable
status: {}
vrf: 03878caf-7820-4e82-9350-48a5202d207e
dp_hit: active

MONITORING FLOW ACTIVITY ON A NETWORK DEVICE

BACKGROUND

Networks can include a plurality of resources connected by communication links, and can be used to connect people, provide services, and organize information, among other activities associated with an enterprise. An example network can include a software-defined network (SDN).

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

A network device (e.g., a network switch) may have limited routing resources, for example, Application-Specific Integrated Circuit (ASIC) resources. A routing or forwarding process in a control plane-data plane architecture may program forwarding entries so that there are no flow misses, and data packets are forwarded at high rates, which may be possible through hardware ASIC forwarding. Since ASIC resources may be limited, flows which are not active may need to be freed to create rooms for new flow entries. Otherwise, unused flows may occupy system resources and prevent programming of active flows in the hardware. In some examples, ASICs may provide support for setting a flow hit bit which can be periodically monitored by the control plane to replace or remove flows that are not active. However, there are many ASICs for which such support is not available in hardware. In some cases, even if flow hit bit support is present, ASIC-related bugs may prevent use of flow hit bits for managing flows. These may result in undesirable scenarios.

To address these technical challenges, the present disclosure describes various examples for monitoring flow activity on a network device. In an example, a neighbor table is maintained on a network device. The neighbor table may include a record of a neighbor network device and a hit bit corresponding to the neighbor network device. The hit bit may be used to represent a flow activity of the neighbor network device. A determination may be made whether a status of the hit bit corresponding to the neighbor network device is inactive. In an example, the determination may comprise determining, from a MAC address table on the network device, whether a destination MAC address corresponding to a destination IP address in the record of the neighbor network device is absent from the MAC address table longer than a pre-defined time period. In response to a determination that the destination MAC address corresponding to the destination IP address in the record of the neighbor network device is absent from the MAC address table longer than the pre-defined time period, the status of the hit bit corresponding to the neighbor network device may be made inactive in the neighbor table.

In response to a determination that the status of the hit bit corresponding to the neighbor network device is inactive, a flow entry corresponding to the neighbor network device may be deleted from an ASIC table on the network device. Since ASIC resources are limited, deletion of the flow entry of an inactive flow creates room for addition of a new flow entire for an active flow. This helps in better management of ASIC resources on the network device. Examples described herein may be deployed for monitoring flows in a network device (e.g., a network switch), even in cases where ASIC support may not be available.

Figure 1:
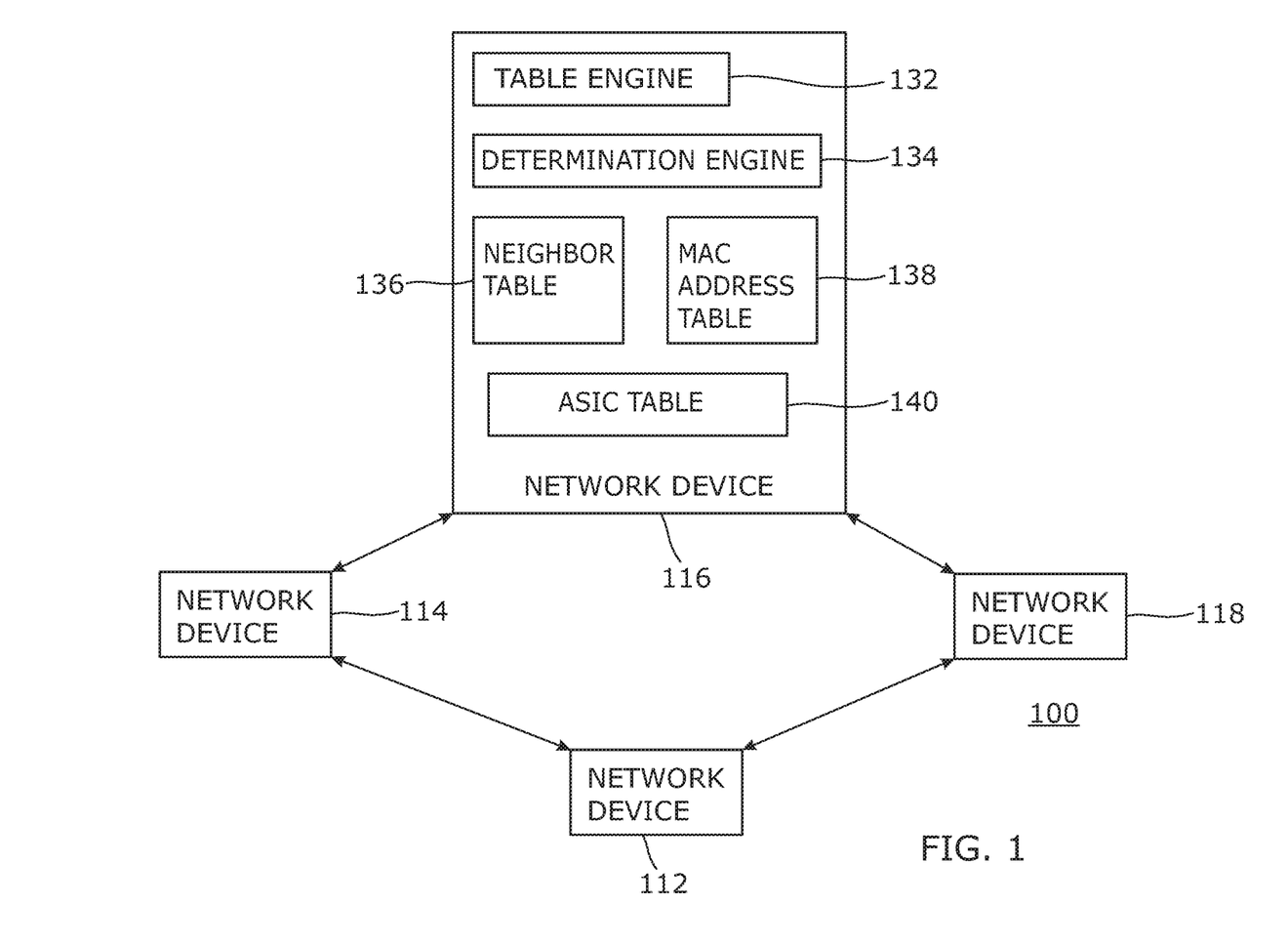
FIG. 1 is a block diagram of an example computing environment for monitoring flow activity on a network device.

FIG. 1 is a schematic block diagram of a computing environment 100 for monitoring flow activity on a network device, according to an example;

In an example, computing environment 100 may include a plurality of network devices 112, 114, 116, and 118. Although four network devices are shown in FIG. 1, other examples of this disclosure may include more or less than four network devices.

Network devices 112, 114, 116, and 118 may be communicatively coupled over a computer network. The computer network may be a wireless or wired network. The computer network may include, for example, a Wide Area Network (WAN), a Metropolitan Area Network (MAN), a Storage Area Network (SAN), a Campus Area Network (CAN), or the like. Further, the computer network may be a public network (for example, the Internet) or a private network.

Network devices 112, 114, 116, and 118 may each be, for example, a network switch, a virtual switch, a router, or a virtual router.

In an example, network devices 112, 114, 116, and 118 may each establish a neighbor relationship with other network devices in the same area or different areas of network. Each network device 112, 114, 116, and 118 may receive route update information from its neighbors. In an example, route update information may be received through a flooding process. Each network device 112, 114, 116, and 118 may maintain a route table, for example, for storing its own route information and route update information obtained from its neighbors.

Route update information may include information about the state of a link(s) generated by a dynamic routing protocol. For example, in OSPF, route update information may be in form of Link State Advertisements (LSAs). Route update information may include, for example, information about neighbors such as neighbor ID, link type, and bandwidth. It may also include information about an interface such as IP address, subnet mask, type of network, and neighboring routers on the link. Each network device may flood its route update information to all neighbor routers. The neighbor network devices may store the information and forward it until all network devices have the same information. Once all the network devices have received the route update information, the network devices may generate a topological map of the network which may be used to determine the best routes to a destination router or node in the network.

In an example, a network device (for example, 116) in the computing environment 100 may include a table engine 132, a determination engine 134, a neighbor table 136, a Media Access Control (MAC) address table 138, and an ASIC table 140. For the sake of simplicity in illustration, network device 116 is shown to include table engine 132, determination engine 134, neighbor table 136, Media Access Control (MAC) address table 138, and ASIC table 140. However, any of the other network devices (for example, 112, 114, or 118) could include these engines. In an example, network device 116 may not include an ASIC that supports a hit bit for indicating the flow activity of a neighbor network device.

Engines 132 and 134 may each include any combination of hardware and programming to implement the functionalities of the engines described herein. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of network device 116. In some examples, the at least one machine-readable storage medium may store instructions that, when executed by the at least one processing resource, at least partially implement some or all engines of network device 116. In such examples, network device 116 may include at least one machine-readable storage medium storing the instructions and the at least one processing resource to execute the instructions.

Neighbor table 136 may include a record of a neighbor network device (e.g., 114), and a hit bit corresponding to the neighbor network device 114. The hit bit may be used to represent a flow activity of the neighbor network device 114. A hit bit corresponding to a neighbor network device 114 may be set if incoming traffic matches that flow entry. In an example, the neighbor table may be an Open vSwitch Database (OVSDB), which is a management protocol in a software-defined networking (SDN) environment.

Figure 2:
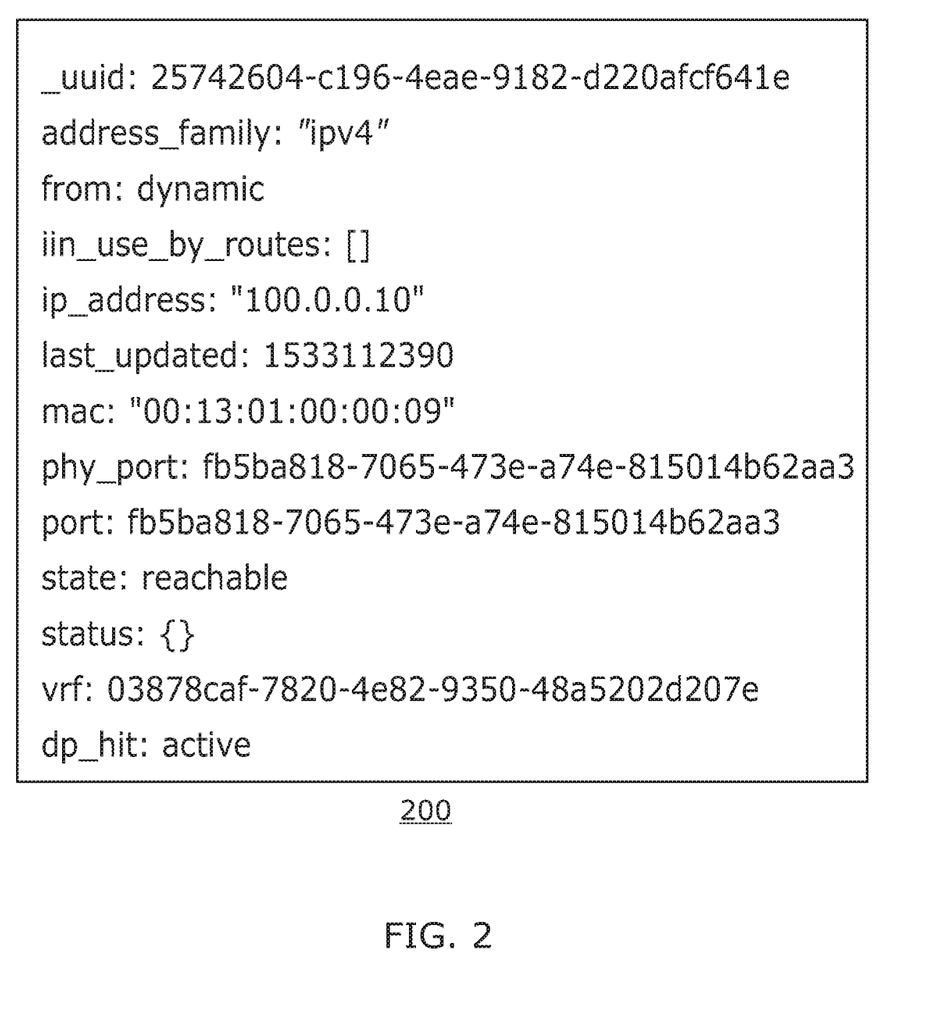
FIG. 2 illustrates an example neighbor table.

FIG. 2 illustrates an example record in a neighbor table 200. Referring to FIG. 2, "_uuid" may represent a Universal Unique Identifier, which is to uniquely identify each row in the table;

"address_family" may represent the address family of the neighbor. It could be IPv4 or IPv6.

"ip_address" may represent IPv4 or IPv6 address of the neighbor;

"vrf" indicates the Virtual Routing and Forwarding (VRF) instance that the neighbor belongs to;

"port" may represent, for example, a logical port LAG, a non-aggregated physical port, or a L3 VLAN interface over which the neighbor was learnt;

"state" may represent a state of the neighbor. For example, reachable, or failed;

"from" may be used to identify the source of the neighbor. For example, a dynamic source, a static source, etc.

"mac" may indicate the MAC address of the neighbor;

"phy_port" may be same as "port", if "port" refers to LAG or non-aggregated physical port, otherwise it references a VLAN member port;

"in_use_by_route" indicates if this neighbor row is referenced by a route, i.e. if the neighbor is a nexthop of an active route;

"last_updated" may indicate the time when the entry was last updated; and "dp_hit" may represent a hit bit. The hit bit may be used to represent a flow activity of a neighbor network device. A hit bit corresponding to a neighbor network device may be set if the incoming traffic matches that flow entry. For example, if the hit bit is set to "active", it may indicate traffic for the neighbor network device. The hit bit may be set to "inactive", if there's no traffic for the neighbor network device.

MAC address table 138 may be used to resolve MAC address of the neighbor network device 114 from its IP address. In an example, Address Resolution Protocol (ARP) may be used for resolving addresses. ARP ties together the data link (Layer 2) layer and the network (Layer 3) layer, and is used to map data-link layer addressing to network layer addressing. Once the MAC address of the neighbor network device 114 is identified, the MAC address is updated in the neighbor table under the "mac" column.

ASIC table 140 may include a hardware table which may be present in an ASIC on network device 116. ASIC table 140 may include a record for each flow entry. In an example, ASIC table 140 may include a respective hit bit for each flow entry. A hit bit related to a flow entry may be set if incoming traffic matches that flow entry. In an example, the ASIC table 140 may not support a hit bit for indicating the flow activity of a neighbor network device.

In an example, table engine 132 may maintain the neighbor table 136 on network device 114. In an example, table engine 132 may maintain the neighbor table 136 by registering for notifications from the kernel of network device 114, for neighbor network device updates. These updates may relate to, for example, addition of a new network device, removal of a network device, or a state change related to an existing neighbor network device (for example, 114). In either of these scenarios, table engine 132 may receive a notification from the kernel. The notifications may be in the form of messages. On receipt of a notification related to a neighbor network device, table engine 132 may update the information related to the neighbor network device 114 in the neighbor table 136. Thus, in an example, table engine 132 may update the neighbor table on the network device 116 upon receiving a notification message from a kernel of the network device 116. The notification message may include information related to an addition of a new network device, a state change of the neighbor network device, or a deletion of an existing neighbor network device.

Table engine 132 may also maintain the "dp_hit" column of the neighbor table 136. The "dp_hit" column may be used to indicate a status of a hit bit corresponding to a neighbor network device (e.g., 114) in the neighbor table. The hit bit may be used to represent a flow activity of the neighbor network device. Table engine 136 may set a hit bit corresponding to a neighbor network device if the incoming traffic matches that flow entry. For example, table engine 136 may set the hit bit to "active", if there's traffic for the neighbor network device. Table engine may set the hit bit to inactive", if there's no traffic for the neighbor network device.

Determination engine 134 may determine whether a status of the hit bit corresponding to the neighbor network device 114 is inactive. In an example, the determination may involve determining, from the MAC address table 138 on the network device 116, whether the MAC address corresponding to the IP address of the neighbor network device 114 is absent from the MAC address table 138 for a duration longer than a pre-defined time period. In an example, the pre-defined time period is longer than the MAC address table aging time, which is a time period used to configure the aging time for entries in the MAC address table 138.

Network device 116 may store MAC addresses of devices that it learns in the MAC address table 138. Along with a MAC address, network device 116 may also store information related to the interface on which the traffic was received and the time when the address was learned in the MAC address table 138. Network device 116 may use a mechanism called aging to keep the MAC address table 138 current. For each MAC address in the MAC address table 138, network device 116 may record a timestamp of when the information about the device was learned. Each time the network device detects traffic from a MAC address that is in its MAC address table 138, it updates the timestamp of that MAC address. A timer on the network device may periodically check the timestamp, and if the MAC address of a device is older than the value set (i.e. MAC address table aging time), network device may remove that MAC address from the MAC address table 138.

In response to a determination that the MAC address corresponding to the IP address of the neighbor network device is absent from the MAC address table 138 longer than the pre-defined time period, determination engine 134 may indicate, in the neighbor table, the status of the hit bit corresponding to the neighbor network device as inactive. In example, the determination may comprises determining a last updated timestamp for the MAC address in the MAC address table 138, and determining whether a time period elapsed after the last updated timestamp for the MAC address is longer than the pre-defined time period. In an example, the "dp_hit" column of the neighbor table may be updated to indicate the status of the hit bit as inactive.

If the MAC address corresponding to the IP address of the neighbor network device is present in the MAC address table 138, a timer corresponding to the pre-defined time period may be activated. And, determination engine 134 may indicate, in the neighbor table, the status of the hit bit corresponding to the neighbor network device as active. If during the timer period, it can be established through other mechanisms, for example, Ping and Telnet, that the MAC address entry in the MAC address table 138 is valid, the timer may be reactivated upon expiry.

In response to the determination that the status of the hit bit corresponding to the neighbor network device is inactive, determination engine 134 may delete a flow entry corresponding to the neighbor network device from the ASIC table 140 on the network device 116. Since ASIC resources are limited, deletion of the flow entry for an inactive flow creates room for addition of a new flow entry for an active flow. This helps in better management of ASIC resources on the network device 116. Determination engine may add a new flow entry corresponding to a new neighbor network device in the ASIC table, in place of the earlier flow entry.

Figure 3:
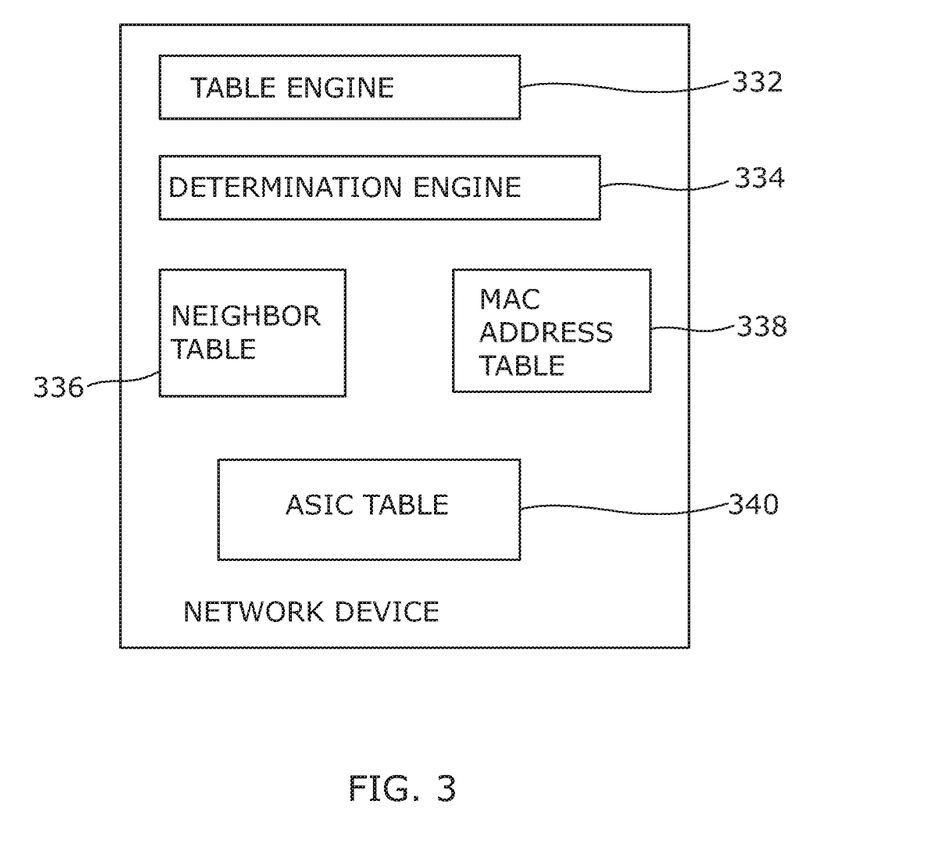
FIG. 3 is a block diagram of an example network device for monitoring flow activity.

FIG. 3 is a block diagram of an example network device 300 for monitoring flow activity. In an example, network device 300 may be analogous to any of the network devices 112, 114, 116, and 118 of FIG. 1, in which like reference numerals correspond to the same or similar, though perhaps not identical, components. For the sake of brevity, components or reference numerals of FIG. 3 having a same or similarly described function in FIG. 1 are not being described in connection with FIG. 1. Said components or reference numerals may be considered alike.

Network device 300 may include, for instance, a network router, a virtual router, a network switch, a virtual switch, or any network device with routing functionality.

In the example of FIG. 3, network device 300 may include a table engine 332, a determination engine 334, a neighbor table 336, a Media Access Control (MAC) address table 338, and an ASIC table 340. In an example, table engine 332, determination engine 334, neighbor table 336, Media Access Control (MAC) address table 338, and ASIC table 340 may perform functionalities similar to those described earlier in reference to table engine 132, determination engine 134, neighbor table 136, Media Access Control (MAC) address table 138, and ASIC table 140 respectively.

In an example, table engine 332 may maintain a neighbor table on network device 300. The neighbor table 336 may include a record for a neighbor network device and a hit bit corresponding to the neighbor network device. The hit bit may be used to represent a flow activity of the neighbor network device. Determination engine 334 may determine whether a status of the hit bit corresponding to the neighbor network device is inactive. In an example, the determination may comprise determining, from a MAC address table 338 on the network device, whether a destination MAC address corresponding to a destination IP address in the record for the neighbor network device is absent from the MAC address table 338 longer than a pre-defined time period.

In response to a determination that the destination MAC address corresponding to the destination IP address in the record for the neighbor network device is absent from the MAC address table 338 longer than the pre-defined time period, determination engine 334 may indicate, in the neighbor table 336, the status of the hit bit corresponding to the neighbor network device as inactive.

In response to a determination that the status of the hit bit corresponding to the neighbor network device is inactive, determination engine 334 may delete a flow entry corresponding to the neighbor network device from ASIC table 340 on the network device 300.

Figure 4:
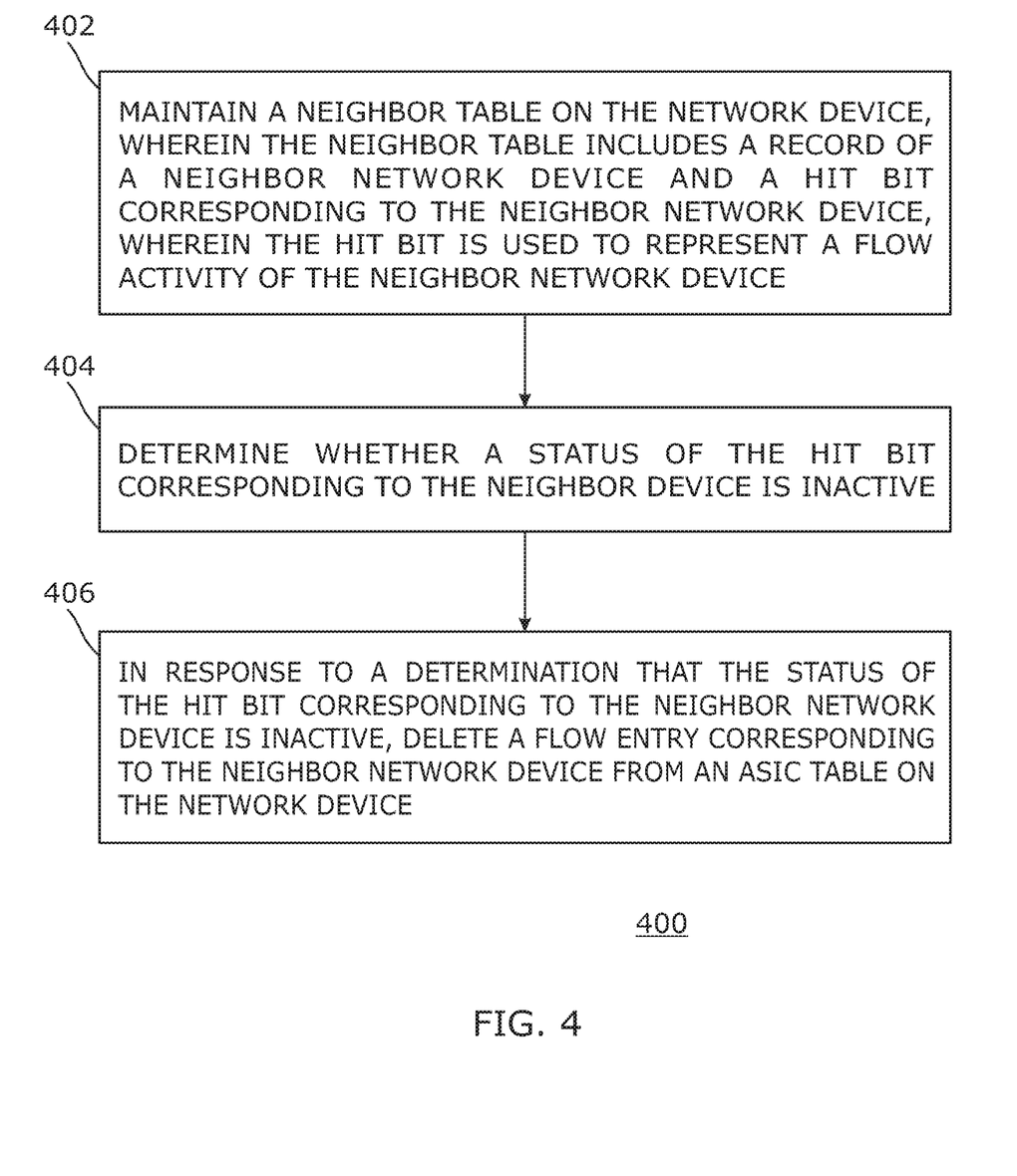
FIG. 4 shows a flow chart of a method of monitoring flow activity on a network device.

FIG. 4 shows a flow chart of a method 400 of monitoring flow activity on a network device, according to an example. The method 400, which is described below, may be partially executed on a computing device such as network device 112, 114, 116, and 118 of FIG. 1 or network device 300 of FIG. 3. However, other suitable computing devices may execute method 400 as well.

At block 402, table engine (for example, 132) may maintain a neighbor table on network device (for example, 116). The neighbor table may include a record of a neighbor network device and a hit bit corresponding to the neighbor network device. The hit bit may be used to represent a flow activity of the neighbor network device. At block 404, determination engine (for example, 134) may determine whether a status of the hit bit corresponding to the neighbor network device is inactive. In an example, the determination may comprise determining, from a MAC address table on the network device, whether a destination MAC address corresponding to a destination IP address in the record of the neighbor network device is absent from the MAC address table longer than a pre-defined time period.

In response to a determination that the destination MAC address corresponding to the destination IP address in the record of the neighbor network device is absent from the MAC address table longer than the pre-defined time period, determination engine may indicate, in the neighbor table, the status of the hit bit corresponding to the neighbor network device as inactive.

At block 406, in response to a determination that the status of the hit bit corresponding to the neighbor network device is inactive, determination engine may delete a flow entry corresponding to the neighbor network device from ASIC table on the network device.

Figure 5:
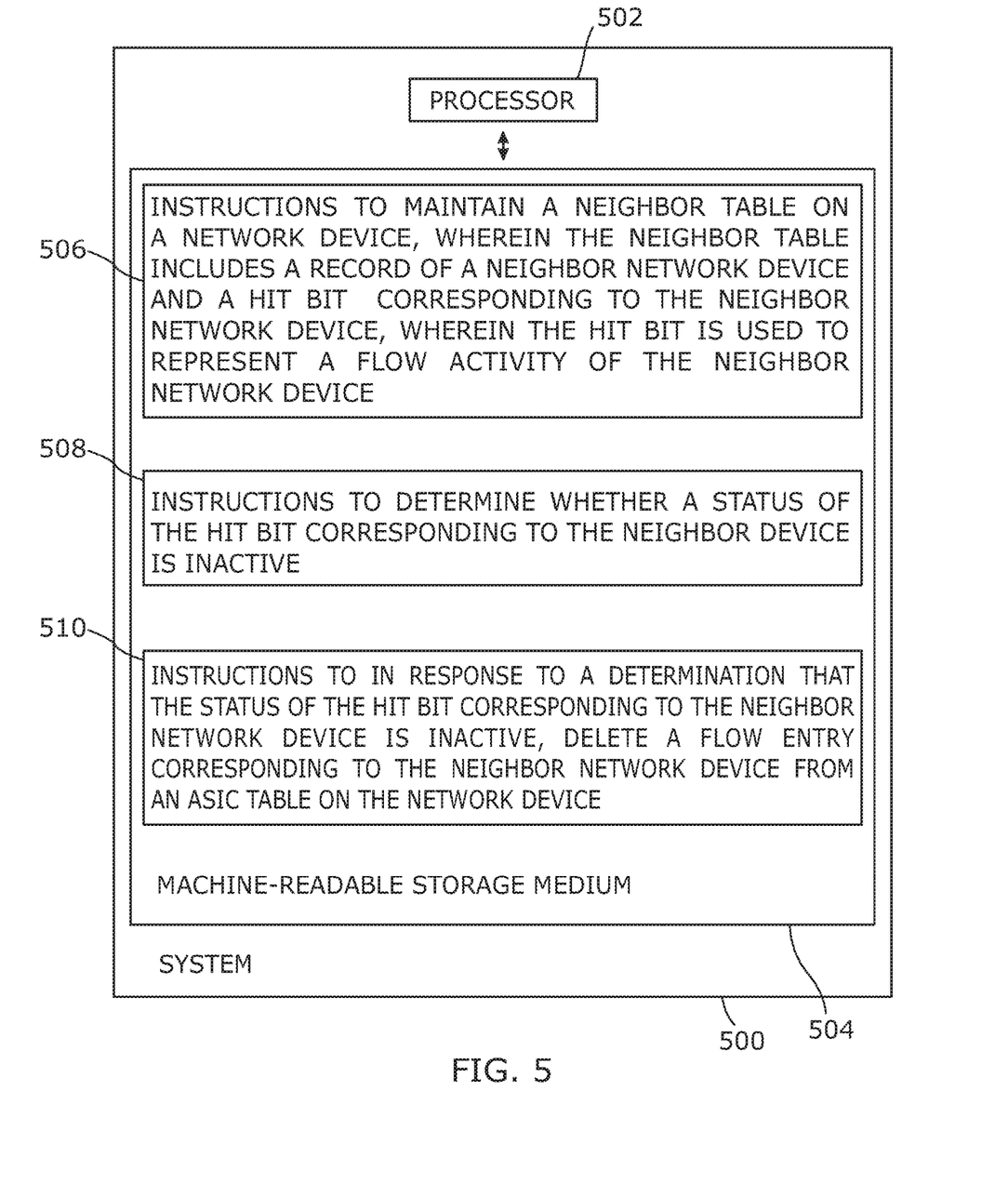
FIG. 5 is a block diagram of an example system including instructions in a machine-readable storage medium for monitoring flow activity on a network device.

FIG. 5 is a block diagram of an example system 500 for monitoring flow activity. System 500 includes a processor 502 and a machine-readable storage medium 504 communicatively coupled through a system bus. In an example, system 500 may be analogous to network device 112, 114, 116, or 118 of FIG. 1, or network device 300 of FIG. 3.

Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 504 may store instructions 506, 508, and 510.

In an example, instructions 506 may be executed by processor 502 to maintain a neighbor table on a network device, wherein the neighbor table includes a record of a neighbor network device and a hit bit corresponding to the neighbor network device, wherein the hit bit is used to represent a flow activity of the neighbor network device.

Instructions 508 may be executed by processor 502 to determine whether a status of the hit bit corresponding to the neighbor network device is inactive. In an example, the instructions to determine may comprise instructions to determine, from a MAC address table on the network device, whether a MAC address corresponding to an IP address in the record of the neighbor network device is absent from the MAC address table longer than a pre-defined time period. In response to a determination that the MAC address corresponding to the IP address in the record of the neighbor network device, is absent from the MAC address table longer than the pre-defined time period, the instructions may indicate, in the neighbor table, the status of the hit bit corresponding to the neighbor network device as inactive.

Instructions 510 may be executed by processor 502 to in response to a determination that the status of the hit bit corresponding to the neighbor network device is inactive, delete a flow entry corresponding to the neighbor network device from an ASIC table on the network device.

For the purpose of simplicity of explanation, the example method of FIG. 4 is shown as executing serially, however it is to be understood and appreciated that the present and other examples are not limited by the illustrated order. The example systems of FIGS. 1, 3 and 5, and method of FIG. 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

The invention claimed is:

1. A method of monitoring flow activity on a network device, comprising:
    maintaining a neighbor table on the network device, wherein the neighbor table includes a record of a neighbor network device and a hit bit corresponding to the neighbor network device, wherein the hit bit is used to represent a flow activity of the neighbor network device;
    maintaining an entry in a media access control (MAC) address table on the network device, wherein the entry comprises a MAC address corresponding to an Internet Protocol (IP) address in the record of the neighbor network device and a last updated timestamp for the MAC address;
    removing the MAC address from the MAC table in response to a determination that an aging period for the entry in the MAC address table is longer than a MAC aging time for the entry, wherein the determination is based on the last updated timestamp;
    determining whether a status of the hit bit corresponding to the neighbor network device is inactive, wherein determining comprises:
        determining, from the MAC address table on the network device, whether the MAC address is absent from the MAC address table longer than a pre-defined time period; and
        in response to a determination that the MAC address corresponding to the IP address in the record of the neighbor network device is absent from the MAC address table longer than the pre-defined time period, indicating, in the neighbor table, the status of the hit bit corresponding to the neighbor network device as inactive, wherein the predefined time period is longer than the MAC aging time; and
    in response to a determination that the status of the hit bit corresponding to the neighbor network device is inactive, deleting a flow entry corresponding to the neighbor network device from an application-specific integrated-circuit (ASIC) table on the network device.

2. The method of claim 1, comprising:
    adding a new flow entry corresponding to a new neighbor network device in the ASIC table, in place of the flow entry corresponding to the neighbor network device.

3. The method of claim 1, wherein determining whether the MAC address corresponding to the IP address in the record of the neighbor network device is absent from the MAC address table longer than the pre-defined time period comprises:
    determining whether a time period elapsed after the last updated timestamp for the MAC address is longer than the pre-defined time period.

4. The method of claim 1, comprising:

updating the neighbor table on the network device, wherein updating comprises:
receiving a notification message from a kernel of the network device; and
updating the neighbor table on the network device based on the notification message.

5. The method of claim 4, wherein the notification message includes information related to an addition of a new network device, a state change of the neighbor network device, and a deletion of an existing neighbor network device.

6. The method of claim 1, wherein the pre-defined time is longer than the MAC address aging time defined for an entry in the MAC address table.

7. The method of claim 1, comprising updating the record of the neighbor network device to indicate the MAC address in the neighbor table.

8. A network device, comprising:
a table engine to:
maintain a neighbor table on the network device, wherein the neighbor table includes a record of a neighbor network device and a hit bit corresponding to the neighbor network device, wherein the hit bit is used to represent a flow activity of the neighbor network device; and
maintain a MAC address table on the network device, wherein an entry in the MAC address table comprises a MAC address corresponding to an Internet Protocol (IP) address in the record of the neighbor network device and a last updated timestamp for the MAC address;
determine whether to remove the MAC address from the MAC table based on an aging period for the entry in the MAC address table and the last updated timestamp; and
a determination engine to:
determine whether a status of the hit bit corresponding to the neighbor network device is inactive, wherein the determination comprises:
determining, from the MAC address table, whether the MAC address corresponding to the IP address in the record of the neighbor network device, is absent from the MAC address table longer than a pre-defined time period; and
in response to a determination that the MAC address corresponding to the IP address in the record of the neighbor network device is absent from the MAC address table longer than the pre-defined time period, indicating, in the neighbor table, the status of the hit bit corresponding to the neighbor network device as inactive, wherein the predefined time period is longer than the MAC aging time;
in response to a determination that the status of the hit bit corresponding to the neighbor network device is inactive, delete a flow entry corresponding to the neighbor network device from an ASIC table on the network device; and
add a new flow entry corresponding to a new neighbor network device in the ASIC table.

9. The network device of claim 8, wherein the neighbor table is an Open vSwitch Database (OVSDB) on the network device.

10. The network device of claim 8, wherein the network device does not include an ASIC that supports the hit bit for indicating the flow activity of the neighbor network device.

11. The network device of claim 8, wherein the record of the network device includes a source of the neighbor network device.

12. The network device of claim 8, wherein the ASIC table represents an ASIC that does not support the hit bit for indicating the flow activity of the neighbor network device.

13. The network device of claim 8, wherein the ASIC table includes a record of a flow entry for each neighbor network device.

14. A non-transitory machine-readable storage medium comprising instructions, the instructions executable by a processor to:
maintain a neighbor table on a network device, wherein the neighbor table includes a record of a neighbor network device and a hit bit corresponding to the neighbor network device, wherein the hit bit is used to represent a flow activity of the neighbor network device;
maintain an entry in a media access control (MAC) address table on the network device, wherein the entry comprises a MAC address corresponding to an Internet Protocol (IP) address in the record of the neighbor network device and a last updated timestamp for the MAC address;
remove the MAC address from the MAC table in response to a determination that an aging period for the entry in the MAC address table is longer than a MAC aging time for the entry, wherein the determination is based on the last updated timestamp;
determine whether a status of the hit bit corresponding to the neighbor network device is inactive, wherein the instructions to determine comprise instructions to:
determine, from the MAC address table, whether the MAC address corresponding to the IP address in the record of the neighbor network device is absent from the MAC address table longer than a pre-defined time period; and
in response to a determination that the MAC address corresponding to the IP address in the record of the neighbor network device, is absent from the MAC address table longer than the pre-defined time period, indicate, in the neighbor table, the status of the hit bit corresponding to the neighbor network device as inactive, wherein the predefined time period is longer than the MAC aging time; and
in response to a determination that the status of the hit bit corresponding to the neighbor network device is inactive, delete a flow entry corresponding to the neighbor network device from an ASIC table on the network device.

15. The storage medium of claim 14, wherein the neighbor table is updated based on a notification message received from a kernel of the network device.

16. The storage medium of claim 14, comprising instructions to create the neighbor table on the network device.

17. The storage medium of claim 14, wherein the record of the network device includes a state of the neighbor network device.

18. The storage medium of claim 14, wherein the status of the hit bit is a part of the record of the neighbor network device.

19. The storage medium of claim 14, wherein the network device is one of a network switch and a network router.

20. The storage medium of claim 14, wherein the ASIC table includes an ASIC hit bit, wherein the ASIC hit bit is used to represent the flow activity of the neighbor network device.

* * * * *